US006738572B2

(12) United States Patent
Hunter

(10) Patent No.: US 6,738,572 B2
(45) Date of Patent: May 18, 2004

(54) FUNCTION DISABLING SYSTEM FOR A CAMERA USED IN A RESTRICTED AREA

(75) Inventor: Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/061,059

(22) Filed: Jan. 29, 2002

(65) Prior Publication Data

US 2002/0106202 A1 Aug. 8, 2002

(30) Foreign Application Priority Data

Feb. 3, 2001 (GB) ............................................. 0102728

(51) Int. Cl.[7] .......................... G03B 17/00; G03B 17/48
(52) U.S. Cl. ............................ 396/56; 396/59; 396/429
(58) Field of Search ............................ 396/56, 59, 263, 396/429; 348/116

(56) References Cited

U.S. PATENT DOCUMENTS

| | | | | |
|---|---|---|---|---|
| 4,743,930 A | | 5/1988 | Satoh | 354/267.1 |
| 5,342,072 A | | 8/1994 | Prasad | 280/87.051 |
| 6,016,407 A | * | 1/2000 | Tsukahara | 396/302 |
| 6,160,964 A | * | 12/2000 | Imoto | 396/300 |
| 6,433,818 B1 | * | 8/2002 | Steinberg et al. | 348/161 |
| 2002/0055361 A1 | * | 5/2002 | McDonnell et al. | 455/456 |

FOREIGN PATENT DOCUMENTS

| | | | |
|---|---|---|---|
| EP | 0505266 A1 | 3/1992 | G08G/1/123 |
| EP | 0680859 A2 | 3/1995 | B60R/25/04 |
| EP | 0830046 A2 | 3/1998 | H04Q/7/38 |
| EP | 0881850 A2 | 12/1998 | H04Q/7/38 |
| EP | 1174840 A2 | 1/2002 | |
| GB | 2286279 A | 8/1995 | G08B/21/00 |
| GB | 2372364 A | 8/2002 | H04N/17/00 |
| JP | 2000333266 | 11/2000 | |
| JP | 2001112031 A | 4/2001 | H04N/17/00 |
| WO | WO 97/49255 | 12/1997 | H04Q/7/32 |
| WO | WO 01/43483 A1 | 6/2001 | H04Q/7/38 |

OTHER PUBLICATIONS

Machine translation of JP 2000–333266, published Nov. 30, 2000.*

* cited by examiner

*Primary Examiner*—David Gray
*Assistant Examiner*—Arthur A Smith

(57) ABSTRACT

Apparatus for restricting and/or prohibiting the use of a portable camera within a predetermined area, the apparatus comprising a first unit (10) mounted in or on a portable camera (not shown). The unit (10) includes a receiver (12) for receiving periodic radio signals (14) from one or more transmitters (16) located remote from the camera within the predetermined area. When the receiver (12) receives a signal (14), it activates a disable module (18) which disables one or more of the functions of the camera while it is within the predetermined areas. The apparatus may also include a GPS tracking system (20) for tracking the location of the camera and/or an alarm module (22) for emitting an alarm in response to receipt of a signal (14) from a transmitter (16).

30 Claims, 2 Drawing Sheets

FUNCTION DISABLING SYSTEM FOR A CAMERA USED IN A RESTRICTED AREA

BACKGROUND OF THE INVENTION

1. Field of the Invention

This invention relates to portable cameras and, in particular, to controlling the use of such cameras in certain specified locations.

2. Related Background Art

Recent advances in technology are such that very small portable cameras are becoming increasingly common. Cameras have been developed which are embedded in mobile telephones or watches, or which can be worn in the manner of badges or glasses.

There are many situations and locations, such as business premises, museums, cinemas, lavatories, etc., where use of cameras is necessarily restricted or prohibited. In the past, such restriction and/or prohibition has been attempted to be achieved by displaying signs indicating the restriction or prohibition on photography in a specified location, and relying on individuals to adhere to such instructions. In some buildings, cameras are confiscated on entry thereto, which was relatively effective with regard to previous generations of cameras as they were relatively large and conspicuous when carried or used.

However, with the development of very small portable cameras, as described above, it is increasingly difficult to detect them being carried or used, making restriction or prohibition of photography in specified locations difficult to enforce.

SUMMARY OF THE INVENTION

We have now devised an arrangement which overcomes the problems outlined above.

In accordance with a first aspect of the present invention, there is provided A location control system for a camera, the system comprising a receiver unit mounted or mountable in or on said camera and a remote transmitter unit positioned within a predetermined area in which the use of camera is to be restricted, said receiver unit being arranged to control a function of said camera in response to a control signal received from said transmitter unit when said camera enters said predetermined area.

The first aspect of the invention extends to a method of restricting the use of a camera within a predetermined area, the method comprising the steps of providing a receiver unit in or on said camera, providing a transmitter unit remote from said camera within said predetermined area, and controlling a function of said camera in response to a signal received by said receiver unit from the transmitter unit.

A number of (preferably low power) possibly radio transmitters are located around and/or within an area where use of cameras is restricted or prohibited. The transmitters emit periodic signals which, when received by the portable camera unit, cause one or more of the functions of the camera to be controlled accordingly.

If, for example, photography is permitted in an area, but flash photography is not, then the apparatus could just be arranged to disable the flash function of the camera. If, however, photography is prohibited within an area, then the apparatus could be arranged to disable the camera altogether while it is within that area.

Thus, for example, the transmitters may be arranged to transmit a signal once per second and, in response to receipt of such a signal, the camera unit may be arranged to disable one or more of the functions of the camera for, say, two seconds, such that those functions of the camera remain disabled until shortly after the camera is removed from within the predetermined area. Alternatively, the apparatus may be arranged to disable one or more of the functions of the camera until it receives another signal (possibly after the camera is removed from the restricted area) to re-enable it.

In yet another embodiment of the first aspect of the invention, the portable camera may be normally disabled, and enabled in response to a signal received from one or more transmitters in or around a predetermined area. Thus, such transmitters could be arranged to emit periodic signals to enable the camera whilst it is within the predetermined area, or the apparatus may be arranged to transmit an enabling signal on entry to the predetermined area and a disabling signal upon exit therefrom. In either case, the camera is arranged to be enabled or active in a limited area or number of locations.

In one specific application, the apparatus may comprise a plurality of normally disabled cameras which operate as entry tickets or passes, or can be rented or sold to people on entry to, for example, a theme park. A plurality of transmitters located within the park transmit periodic signals to enable such cameras but, once the camera is removed from the park, it becomes useless because it is out of range of the necessary actuation signals, thereby providing a greater incentive for people to return the cameras when they leave the park.

In yet another embodiment of the first aspect of the invention, the apparatus may include means for tracking the location of a the camera within a predetermined area by, for example, detecting signals periodically transmitted by a unit within the camera, and for transmitting a signal to disable one or more of the functions of the camera as it enters a restricted zone. The apparatus may then continue to track the camera until it leaves the restricted zone and transmit a re-enabling signal accordingly.

In accordance with a second aspect of this invention, there is provided a location control system for a camera, the system comprising a receiver unit mounted or mountable in or on said camera and a remote transmitter unit positioned within a predetermined area in which the use of camera is restricted, said receiver unit being arranged to actuate an alarm in response to a control signal received from said transmitter unit when said camera enters said predetermined area.

In one embodiment of the second aspect of the invention, the portable camera may include a transmitter unit which always transmits intermittent signals, for example low power radio signals, and when those signals are detected by one of a plurality of receivers located around and/or within an area where cameras are prohibited, an alarm may be actuated to alert security staff of the presence and approximate location of the concealed camera.

In accordance with a third aspect of the invention, there is provided a location control system for a camera, the system comprising a first unit mounted or mountable in or on said camera and a remote second unit, at least one of said units being arranged to emit an alarm when the system detects that the camera is being used in a predetermined area in which the use of camera is restricted.

Thus, in locations where a camera can be carried provided it is not used, security staff can detect such use and take appropriate action.

In general, the apparatus and method of the foregoing aspects of the present invention provide a way of allowing cameras to be brought into predetermined areas, but restricts their use either fully or partially whilst within that area.

It is intended to enact laws whereby all portable or concealable cameras must include means for actuating an alarm and/or disabling one or more of its functions in restricted areas. It is expected that a universal protocol will be developed to achieve this.

In accordance with a fourth aspect of the invention, there is provided a location control system for a camera, the system comprising a programmable unit mounted or mountable in or on said camera for controlling, in response to data received from an external unit, a function of said camera when the camera enters a predetermined area in which the use of camera is to be restricted.

In one embodiment of the fourth aspect of the invention, the programmable unit includes a contact device reader for receiving a contact device, such as a smart card or the like, from which data is transferred to enable and/or disable one or more of the camera's functions. The functions of the camera may be enabled by default and disabled, selectively or otherwise, in response to data received from the external programming means. Alternatively, some or all of the functions of the camera may be disabled by default, and enabled, selectively or otherwise, in response to data received from the external programming means.

In a specific exemplary embodiment of the fourth aspect of the invention, the programmable unit may be arranged to receive data indicative of one or more specific areas within said predetermined location together with camera functions permitted to be enabled in the or each said area, the apparatus comprising a location determining device for determining the location of said camera within said predetermined area and enabling and/or disabling one or more of the functions thereof according to the area in which it is located.

In a preferred embodiment of the fourth aspect of the present invention, the apparatus further comprises means for actuating an alarm in the event that unauthorised camera functions are operated within said predetermined area. The apparatus may itself be equipped with an alarm, or it may transmit a signal for receipt by a remote unit within the predetermined area, in response to which the remote unit actuates an alarm.

The fourth aspect of the present invention extends to a method of restricting or prohibiting use of a portable or concealable camera within a predetermined area, corresponding to the apparatus defined above.

It will be understood that all references herein to "cameras" are intended to encompass "image capturing devices" generally.

BRIEF DESCRIPTION OF THE DRAWINGS

Embodiments of the present invention will now be described by way of examples only and with reference to the accompanying drawings, in which.

DETAILED DESCRIPTION OF THE PREFERRED EMBODIMENTS

Figure 1:
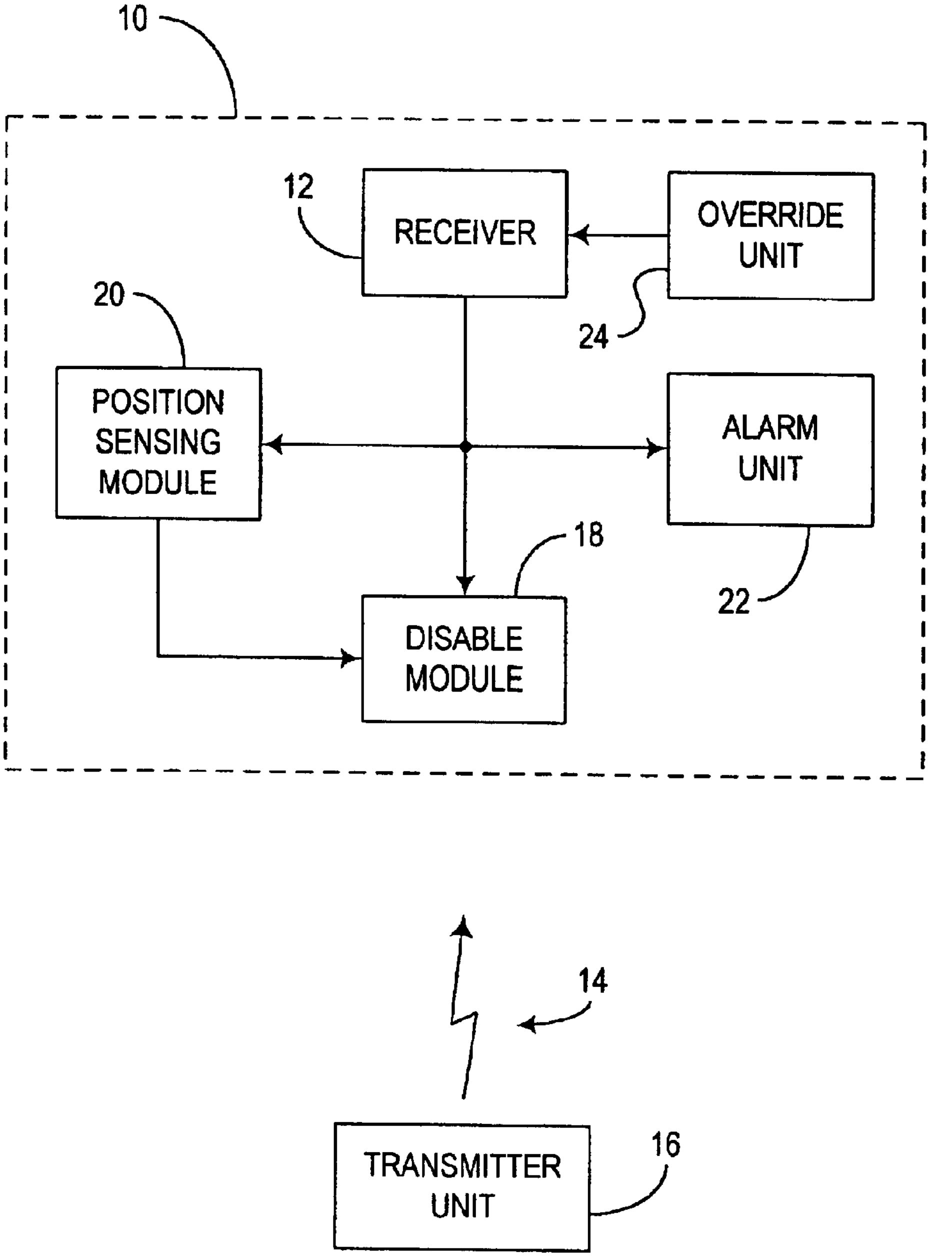
FIG. 1 is a schematic block diagram illustrating the various possible functions of apparatus according to a first specific embodiment of the invention.

Referring to FIG. 1, apparatus according to one specific embodiment of the invention comprises a first unit 10 housed within a portable camera (not shown). The unit 10 includes a receiver 12 for receiving low power, short range radio signals 14 emitted by one or more remote transmitter units 16.

The first unit 10 further comprises a disable module 18 which, when actuated, is arranged to disable one or more functions of the portable camera, possibly selectively according to the signal it receives to actuate it. In its simplest form, however, the receiver 12 may be arranged to transmit an activating signal directly to the disable module 18 when one or more signals 14 are received from the remote transmitter unit 16, in response to which the disable module 18 disables the camera altogether or one specific function thereof, such as the flash.

In a more elaborate embodiment, the unit 10 may include a position sensing module 20 which, when actuated, tracks the location of the portable camera. (Over a large area, such as for example a university campus, a GPS module may provide sufficiently accurate location information to track the position of a portable camera). In this embodiment, the signals 14 transmitted by the remote transmitter unit include information regarding the areas in which photography is restricted or prohibited. The signals 14 are received and transmitted to the GPS module 20 which tracks the location of the portable camera. When the camera enters a restricted zone, the position sensing module 20 transmits a signal to the disable module 18 to disable one or more of the functions of the camera accordingly. The GPS module 20 continues to track the camera until it leaves the restricted zone, and then sends another signal to the module 18 to re-enable the functions of the camera.

The unit 10 may additionally or alternatively include an alarm unit 22 which is actuated in response to receipt of one or more signals 14 from the remote transmitter unit 16, to emit an audible and/or visible alarm signal to alert security staff of the presence of a portable camera within a restricted area.

The unit 10 may further include an override unit 24 which can be used to override some or all of the disablements and/or alarm functions of the unit 10 upon entry of, for example, an authorised security code or insertion of a security card or key.

Figure 2:
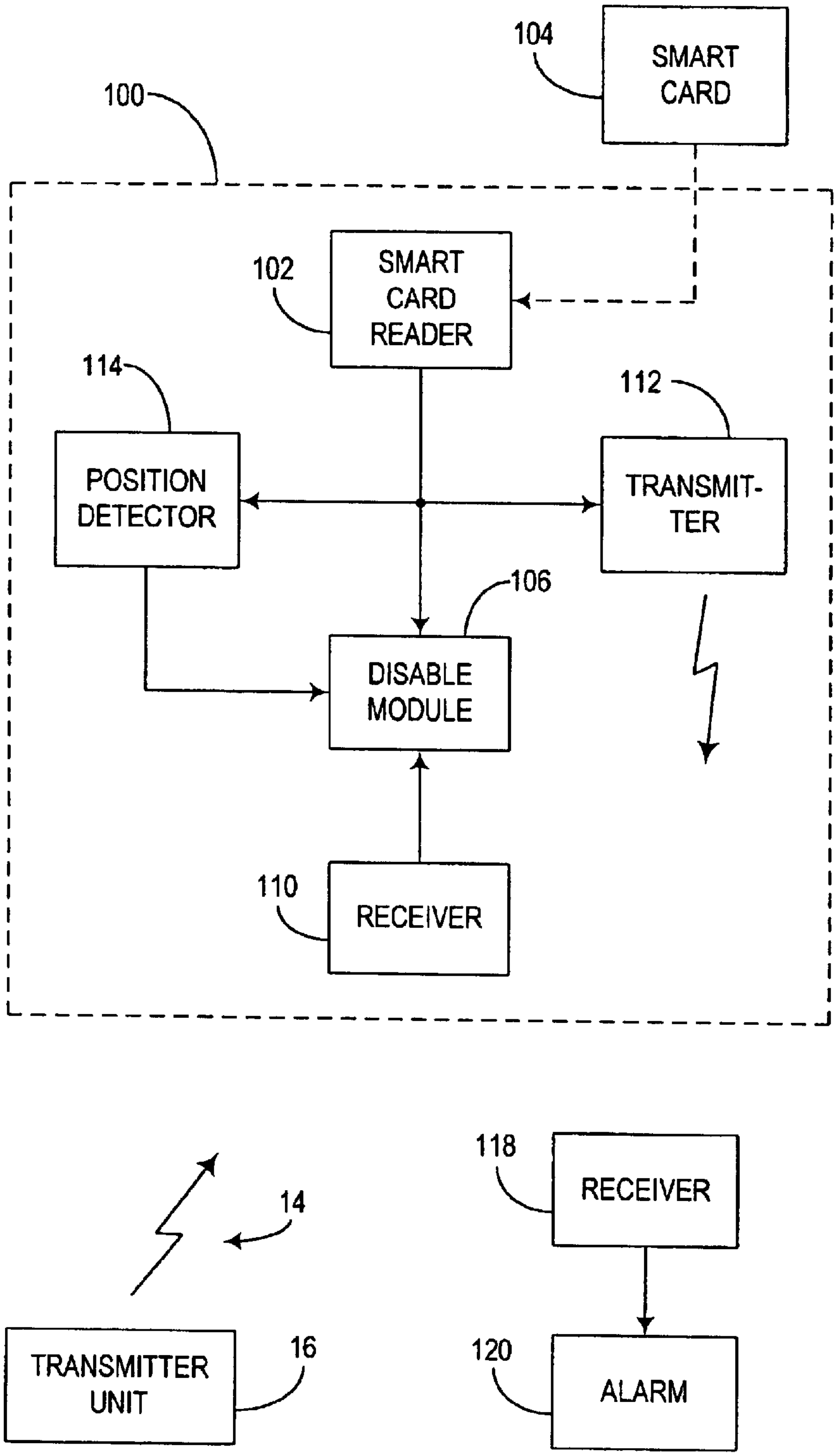
FIG. 2 is a schematic block diagram illustrating the various possible functions of apparatus according to a second specific embodiment of the invention.

Referring to FIG. 2 of the drawings, apparatus according to another specific embodiment of the invention comprises a unit 100 housed within a portable camera (not shown). The unit 100 includes a smart card reader 102 for receiving a smart card 104 on which is stored data relating to permitted (or otherwise) camera functions within a predetermined area.

In this embodiment, all of the portable camera functions are normally enabled. Thus, the unit 100 further comprises a disable module 106 which, when actuated, is arranged to disable one or more of the functions of the portable camera, in accordance with data stored on the smart card 104. Thus, in its simplest form, in a predetermined area where photography is not permitted, when the smart card 104 is inserted into or swiped through the card reader 102, the disable module 106 disables all of the camera's functions. It may be necessary to insert or swipe another smart card upon exit from the predetermined area in order to re-enable all of the camera's functions. Alternatively, the unit 100 may include a receiver 110 which, in response to receipt of a signal transmitted by a remote transmitter 116 at the exit to the predetermined area, automatically re-enables all of the camera's functions.

In an alternative embodiment, the data read from the smart card may only cause some of the functions of the camera, e.g. the flash, to be disabled in accordance with specific regulations defined for a particular area.

The unit 100 may further comprise a transmitter 112 for transmitting a signal in the event that the camera is used within a predetermined area. The signal is received by a receiver within the area, which actuates an alarm in the event that the camera has not been properly programmed.

In another embodiment of the invention, the data read from the smart card 104 defines specific areas within the predetermined area together with permitted (or non-permitted) camera functions in those area. The unit 100 comprises a position detector 114 for tracking the position of the camera within the predetermined area, the disable module 106 being arranged to selectively disable (and re-enable) functions of the camera according to its location within the predetermined area.

Thus, in a specific embodiment of the second aspect of the invention, the apparatus (or the camera) is provided with a slot for reading magnetic stripe cards (like a slot for swiping credit cards). The cards act as controlling units. The apparatus is designed to activate or deactivate the functions of the camera by swiping cards having different configurations written into their magnetic stripes. The magnetic stripe of a card may also contain a code that will lock the camera functions and prevent any further changes to its configuration unless (a) subsequent cards have a matching code or (b) another card with the same code is used to unlock it.

For example, a museum may implement a policy that only cameras of the type described above may be carried into the museum's galleries and that they must be swiped on entry to disable functions such as flash photography. All other cameras must be surrendered on entry. As well as disabling flash, swiping the permitted cameras might limit the resolution of the pictures that can be taken within the gallery. If a visitor wishes to take more detailed pictures, he or she can purchase a photo license card. When swiped through the slot in the camera, the photo license card will re-enable full resolution photography for one photograph only. Depending on the fee paid, the card may be used one or more times. On exit from the gallery, the visitor's camera is swiped again to re-enable the original functions.

Many variations on this these are possible, for example, the camera could be programmed on entry to the museum (by electrical contact with a programming device) in order to install a simple table of museum locations and the functions to be enabled at each. The camera could then control its own capabilities by tracking its position using a built-in position sensor (which could function by any one of several known techniques).

Specific embodiment of the invention have been described above by way of examples only, and it will be apparent to a person skilled in the art that modifications and variations can be made to the described embodiments without departing from the scope of the invention as defined in the appended claims.

I claim:

1. A camera operative to perform a plurality of imaging functions, the camera comprising:

a receiver unit operative to receive an external function control signal from a remote unit, the external function control signal including information for restricting a first imaging function of the camera when the camera is located within a predetermined area;

a position sensing module operative to receive a position signal to determine the location of the camera with respect to the predetermined area; and a disable module operative to receive the external function control signal from the receiver unit and disable the first imaging function of the camera when the position sensing module determines that the camera is located within the predetermined area.

2. The camera of claim 1, wherein the disable module disables a flash function of the camera and enables an image-capturing function of the camera.

3. The camera of claim 1, wherein the disable module disables a high-resolution image-capturing function of the camera and enables a low-resolution image-capturing function of the camera.

4. The camera of claim 1, wherein the receiver unit receives first function control signal for restricting a first set of imaging functions of the camera when the camera is located in a first specific region of the predetermined area and a second function control signal for restricting a second set of imaging functions of the camera when the camera is located in a second specific region of the predetermined area.

5. The camera of claim 1, wherein the receiver unit receives a first function control signal disables or disabling a set of imaging functions of the camera when the camera enters the predetermined area and at second function control signal for re-enabling the set of imaging functions of the camera when the camera leaves the predetermined area.

6. The camera of claim 1, further comprising an alarm unit.

7. The camera of claim 6, wherein the alarm unit indicates when the camera is located in a restricted area.

8. The camera of claim 6, wherein the alarm unit indicates when the camera performs a restricted imaging function in the predetermined area.

9. The camera of claim 6, wherein the alarm unit includes an audible alarm.

10. The camera of claim 6, wherein the alarm unit includes a visual alarm.

11. The camera of claim 1, wherein the receiver unit receives the external function control signal from a remote radio transmitter unit.

12. The camera of claim 1, wherein the receiver unit receives a plurality of external function control signals from a plurality of remote radio transmitter units.

13. The camera of claim 1, wherein the receiver unit receives the external function control signal from a programming device that temporarily contacts the receiver unit.

14. The camera of claim 13, wherein the receiver unit comprises a card reader and the programming device comprises a license card.

15. The camera of claim 1, further comprising an internal transmitter operative to transmit a signal to an external receiver.

16. The camera of claim 15, wherein the internal transmitter transmits the signal to the external receiver when the camera is located within the predetermined area, the external receiver operative to initiate an external alarm in response to the signal.

17. The camera of claim 15, wherein the internal transmitter transmits the signal to the external receiver when the camera performs an imaging function in the predetermined area, the external receiver operative to initiate an external alarm when the imaging function is a prohibited function.

18. The camera of claim 1, wherein the receiver unit receives a first function control signal for enabling a set of imaging functions of the camera when the camera enters the predetermined area and a second function control signal for disabling the set of imaging functions of the camera when the camera leaves the predetermined area.

19. A method for disabling an imaging function of a camera, the method comprising:

receiving an external function control signal from a remote unit, the external function control signal including information for restricting a first imaging function of the camera when the camera is located within a predetermined area;

receiving a position signal;

processing the position signal to determine the location of the camera with respect to the predetermined area; and disabling the first imaging function of the camera when the camera is located within the predetermined area.

20. The method of claim 19, wherein disabling the first imaging function comprises disabling a flash function of the camera and enabling an image-capturing function of the camera.

21. The method of claim 19, wherein disabling the first imaging function comprises disabling a high-resolution image-capturing function of the camera and enabling a low-resolution image-capturing function of the camera.

22. The method of claim 19, wherein receiving an external function control signal further comprises receiving a first function control signal for restricting a first set of imaging functions of the camera when the camera is located in a first specific region of the predetermined area and a second function control signal for restricting a second set of imaging functions of the camera when the camera is located in a second specific region of the predetermined area.

23. The method of claim 19, wherein receiving an external function control signal further comprises receiving a first function control signal for disabling a set of imaging functions of the camera when the camera enters the predetermined area and a second function control signal for re-enabling the set of imaging functions of the camera when the camera leaves the predetermined area.

24. The method of claim 19, further comprising:

providing an internal alarm signal when the camera is located in a restricted area.

25. The method of claim 19, further comprising:

providing an internal alarm signal when the camera performs a restricted imaging function in the predetermined area.

26. The method of claim 19, further comprising:

transmitting a plurality of function control signals from a plurality of remote radio transmitter units;

wherein receiving the external function control signal further comprises receiving the plurality of function control signals from the plurality of remote radio transmitter units.

27. The method of claim 19, wherein receiving the external function control signal comprises temporarily contacting the camera with a programming device.

28. The method of claim 19, further comprising:

transmitting a signal to an external receiver when the camera is located within the predetermined area; and initiating an external alarm in response to the signal.

29. The method of claim 19, further comprising:

transmitting a signal to an external receiver when the camera performs an imaging function in the predetermined area; and initiating an external alarm when the imaging function is a prohibited function.

30. The method of claim 19, wherein receiving an external function control signal further comprises receiving a first function control signal for enabling a set of imaging functions of the camera when the camera enters the predetermined area and a second function control signal for disabling the set of imaging functions of the camera when the camera leaves the predetermined area.

* * * * *